United States Patent
Xiao et al.

(10) Patent No.: US 12,302,194 B2
(45) Date of Patent: May 13, 2025

(54) METHODS AND SYSTEMS FOR POSITIONING OF WIRELESS DEVICES

(71) Applicant: ZTE Corporation, Guangdong (CN)

(72) Inventors: Huahua Xiao, Guangdong (CN);
Guozeng Zheng, Guangdong (CN);
Chuangxin Jiang, Guangdong (CN);
Zhaohua Lu, Guangdong (CN);
Shujuan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 441 days.

(21) Appl. No.: 17/853,482

(22) Filed: Jun. 29, 2022

(65) Prior Publication Data

US 2022/0329981 A1   Oct. 13, 2022

Related U.S. Application Data

(63) Continuation of application No. PCT/CN2020/109182, filed on Aug. 14, 2020.

(51) Int. Cl.
*H04W 4/029*   (2018.01)
*H04W 56/00*   (2009.01)

(52) U.S. Cl.
CPC ......... *H04W 4/029* (2018.02); *H04W 56/006* (2013.01)

(58) Field of Classification Search
CPC .................. H04W 64/00; H04W 4/029; H04W 64/006; H04W 72/23; H04W 4/025; H04W 56/001; H04W 76/15
See application file for complete search history.

(56) References Cited

U.S. PATENT DOCUMENTS 6,230,018 B1   5/2001   Watters et al.
2011/0074634 A1*   3/2011   Yeo ........................ G01S 5/0218
342/463

(Continued)

FOREIGN PATENT DOCUMENTS

CN   101442823 A   5/2009
CN   102077663 A   5/2011

(Continued)

OTHER PUBLICATIONS

International Search Report mailed May 13, 2021 for International Application No. PCT/CN2020/109182.

(Continued)

*Primary Examiner* — Kwasi Karikari
(74) *Attorney, Agent, or Firm* — Crowell & Moring LLP

(57) ABSTRACT

This disclosure describes methods and systems for estimating positions of a mobile terminals. The position of a mobile terminal may be estimated based on measured timing information of reference signals transmitted by a plurality of base stations and received by the mobile terminal as compensated by non-line-of-sight (NLOS) delay times in the reference signal propagation times. The NLOS delay times may be estimated using one or more positioning anchors. Alternatively, the NLOS delay times may be estimated by using multiple spatially separate antennas of the mobile terminal, by jointly with other mobile terminals, or by using other approximation methods. The approaches provided by this disclosure facilitate more accurate position estimates for high precision mobile positioning applications.

18 Claims, 6 Drawing Sheets

(56) References Cited

U.S. PATENT DOCUMENTS

| | | | | |
|---|---|---|---|---|
| 2011/0177828 A1* | 7/2011 | Bocquet | ............... | G01S 5/14 |
| | | | | 455/456.1 |
| 2013/0033999 A1 | 2/2013 | Siomina et al. | | |
| 2017/0212211 A1 | 7/2017 | Gates et al. | | |
| 2017/0367067 A1 | 12/2017 | Hwang et al. | | |
| 2018/0310237 A1* | 10/2018 | Kumar | ............... | G01S 5/10 |

FOREIGN PATENT DOCUMENTS

| | | |
|---|---|---|
| CN | 109891260 A | 6/2019 |
| CN | 111213393 A | 5/2020 |

OTHER PUBLICATIONS

Written Opinion mailed May 13, 2021 for International Application No. PCT/CN2020/109182.

Supplementary European Search Report, Nov. 3, 2023, pp. 1-15, issued in European Application No. 20949136.4, European Patent Office, Munich Germany.

\* cited by examiner

METHODS AND SYSTEMS FOR POSITIONING OF WIRELESS DEVICES

CROSS REFERENCE

This application is a continuation of and claims priority to International Patent Application No. PCT/CN2020/109182, filed Aug. 14, 2020, which is herein incorporated by reference in its entirety.

TECHNICAL FIELD

This disclosure is directed to methods and systems for geographic positioning of wireless devices in wireless communication networks.

BACKGROUND

Wireless communication technologies are moving the world towards a rapidly increasing network connectivity. In many applications, such as Industrial Internet of Things (IIoT) and V2X applications (including Vehicle-to-Infrastructure, vehicle-to-network, vehicle-to-pedestrian applications, and the like), it may be desirable to accurately determine geographic positions of various wireless devices and network nodes. Position estimation, for example, may be derived from distance estimates based on measurements of propagation times of wireless reference signals from network nodes or devices with known geographic locations. Estimation of distances between wireless devices based on reference signal propagation times may become inaccurate when the reference signals transmit via multiple reflections rather than direct paths.

SUMMARY

This disclosure describes methods and systems for estimating reference signal transmission delay times between wireless network nodes or devices due to multiple reflections and/or refractions. The estimated transmission delays are used to more accurately estimate geographic positions of wireless devices based on, for example, hyperbolic or triangular positioning technologies using measured Time Of Arrival (TOA) information and/or other timing information of the reference signals.

In some implementations, a method performed by an anchor device is disclosed. The method may include receiving reference signals transmitted from a plurality of wireless network nodes; obtaining geographic locations of the plurality of wireless network nodes; determining time delays in signal propagation times of the reference signals beyond corresponding line-of-sight (LOS) transmission times; and transmitting the time delays to a positioning server or a mobile terminal to enable the positioning server or the mobile terminal to perform geographic positioning of the mobile terminal.

In some other implementations, a method performed by a positioning service node in a wireless communication network is disclosed. The method may include obtaining a set of timing measurement information associated with reference signals transmitted by a plurality of wireless network nodes and received by a mobile terminal; obtaining geographic locations of the plurality of wireless network nodes; estimating time delays in signal propagation times of the reference signals beyond corresponding LOS transmission times; compensating the set of timing measurement information with the estimated time delays to obtain a compensated timing measurement information; and determining a geographic position of the mobile terminal based on the compensated timing measurement information and the geographic locations of the plurality of wireless network nodes.

In some other implementations, a method performed by a mobile terminal is disclosed. The method may include receiving reference signals from a plurality of wireless network nodes; measuring reference signal propagation times of the received reference signals; obtaining estimated time delays in the reference signal propagation times beyond corresponding LOS transmission times; and transmitting the estimated time delays and the reference signal propagation times, or transmitting a compensated reference signal propagation times based on the reference signal propagation times compensated by the estimated time delays to a positioning service node to cause the positioning service node to estimate a geographic position of the mobile terminal.

Various devices or systems are further disclosed. Each of these devices or systems includes a processor, wherein the processor is configured to implement any one of the methods above.

Computer-readable media are further disclosed. Such a computer-readable medium includes instructions which, when executed by a computer, cause the computer to carry out any one of the methods above.

The above embodiments and other aspects and alternatives of their implementations are described in greater detail in the drawings, the descriptions, and the claims below.

DETAILED DESCRIPTION

The technologies and examples of implementations and/or embodiments in this disclosure can be used to improve performance of geographic positioning of wireless devices in wireless communication networks. The term "exemplary" is used to mean "an example of" and unless otherwise stated, does not imply an ideal or preferred example, implementation, or embodiment. The implementations may be embodied in a variety of different forms and, therefore, the scope of this disclosure or claimed subject matter is intended to be construed as not being limited to any of the embodiments set forth below. The various implementations may be embodied as methods, devices, components, or systems. Accordingly, embodiments of this disclosure may, for example, take the form of hardware, software, firmware or any combination thereof.

By way of introduction, many applications in new generations of wireless communication networks require high-accuracy geographic positioning of various network devices. Such applications include but are not limited to Industrial Internet of Things (IIoT) and V2X applications (including vehicle-to-infrastructure, vehicle-to-network, vehicle-to-pedestrian applications, and the like).

Geographic positions of a wireless network device (either mobile or fixed) may be obtained using hyperbolic or triangular positioning methods based on estimating distances between the wireless network devices and other network devices having known locations. Such distances, for example, may be estimated by measuring times of flight or times of arrival of wireless signals transmitted between the network devices. Wireless signals designed for these time measurements may be referred to as reference signals (those having ordinary skill in the art understand that such reference signals may be designed to have purposes other than timing measurements, such as power control). In particular, assuming a direct line-of-sight (LOS) wireless signal propagation, a distance between two wireless devices may be estimated by multiplying a time of flight of a reference signal communicated between the two wireless devices with a propagation speed of the reference signal (e.g., nearly speed of light, denoted by c).

Figure 1:
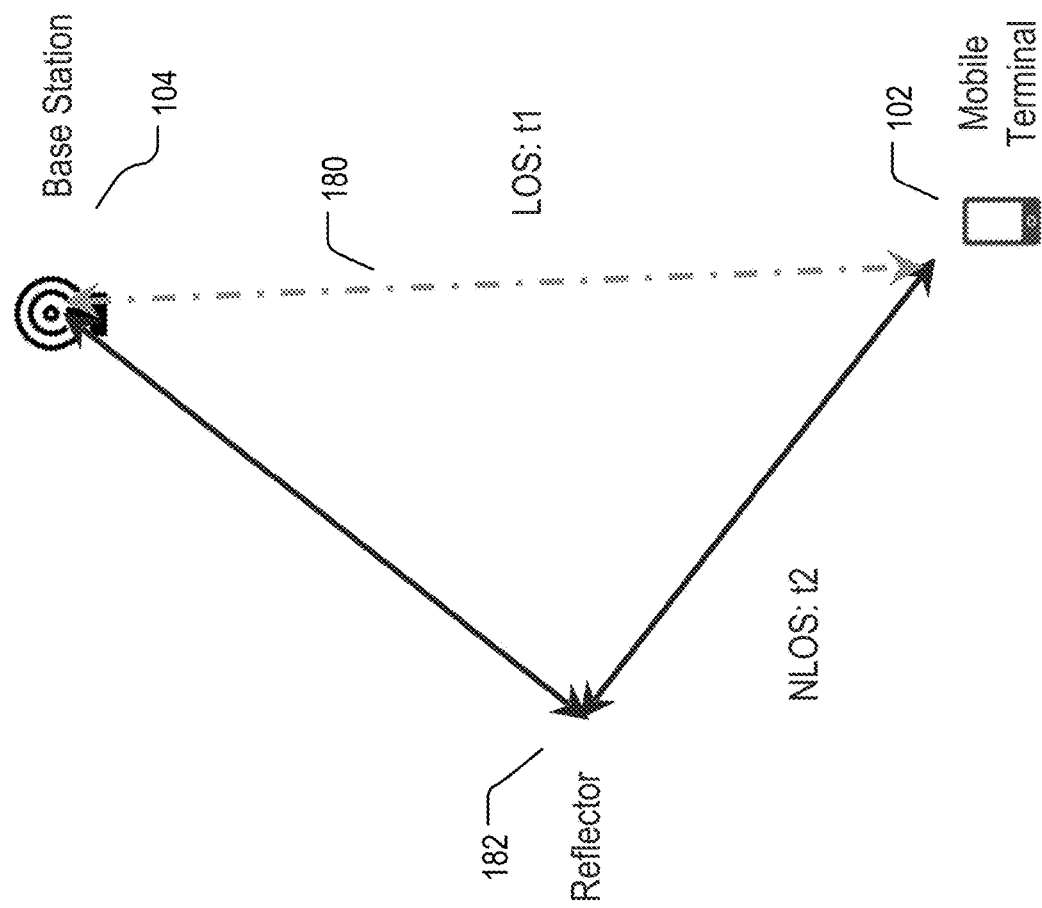
FIG. 1 illustrates reference signal transmission via a non-line-of-sight (NLOS) rather than line-of-sight (LOS) path and transmission time delay therebetween.

The assumption of LOS for the reference signals may not always hold. For example, as shown in FIG. 1, in wireless networks such as the fourth generation (4G) and fifth generation (5G) cellular networks, a mobile terminal 102 may be located in an urban environment, where one or more of the base stations 104 relied on by the mobile terminal 102 for geographic positioning may not be in direct line-of-sight of the mobile terminal 102 (e.g., the direct LOS paths 180 may be blocked by obstacles, such as buildings). As such, reference signals transmitted from these base stations may arrive at the mobile device after multiple reflections and/or diffractions 182. In other words, these reference signals may, in actuality, take non-line-of-sight (NLOS) paths (as indicated by the solid arrows in FIG. 1) rather than LOS transmission paths (as indicated by the dash-dot arrow in FIG. 1) to the mobile terminal. The transmission time t2 of a reference signal transmitted via an NLOS path would be longer than a corresponding LOS signal transmission time t1, as indicated in FIG. 1.

Therefore, using the measured reference signal transmission times under the LOS assumption would cause overestimation of distances between the mobile device and the various base stations, leading to inaccuracy in hyperbolic or triangular positioning of the mobile device. An excess time delay caused by transmission path elongation due to multiple NLOS reflections and/or refractions may be denoted as $\Delta\tau = t2 - t1$. If left unaccounted for, an average delay value of $\Delta\tau \approx 39$ ns, for example, would cause a corresponding distance estimate error of around 12 meters, leading to unacceptable positioning accuracy for many high precision positioning applications described above. Thus, it is critical to estimate excess transmission time delays of the reference signals due to NLOS path elongation and use such transmission time delays to facilitate more accurate geographic positioning of mobile devices.

This disclosure generally relates to methods, devices, and systems for estimating the transmission time delays of reference signal due to NLOS reflections and/or refractions, and using the estimated transmission time delays to improve geographic positioning accuracy of mobile devices in a wireless communication network. While the example embodiments below may be provided at times in the context of reference signal NLOS time delay estimation in 4G or 5G cellular networks, the underlying principles of this disclosure are generally applicable to geographic positioning of both fixed or mobile wireless network devices and to wireless infrastructures other than 4G or 5G networks.

Network Architecture

Figure 2:
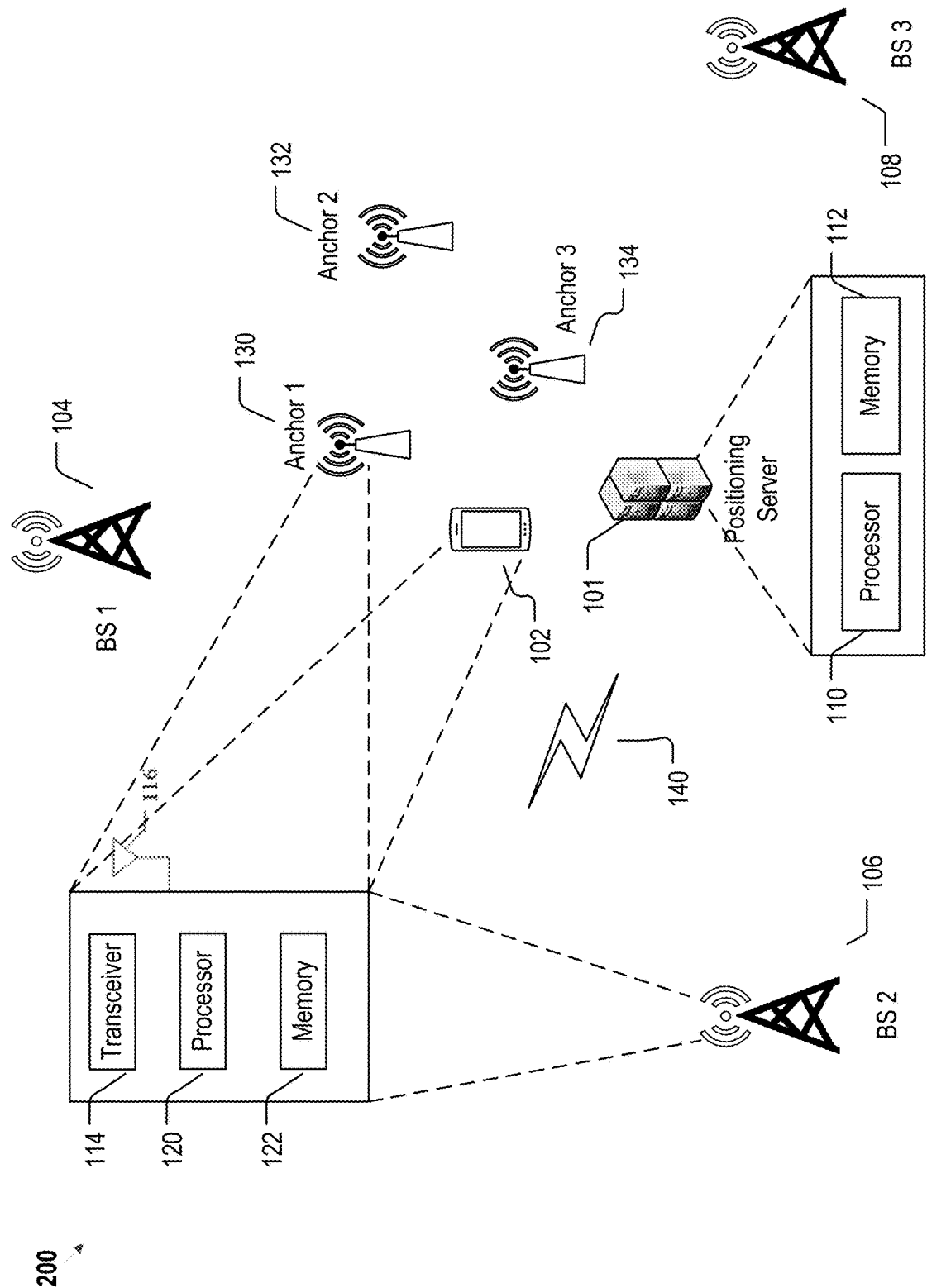
FIG. 2 illustrates a portion of an example wireless communication network configured for estimating NLOS time delays for improving geographic positioning of wireless devices.

FIG. 2 shows a portion of a wireless network 200 for effectuating the various embodiments of the present disclosure. As shown in FIG. 2, the wireless network includes user equipment or mobile terminal 102, base stations 104, 106, and 108, positioning anchors 130, 132, and 134, and a positioning server 101. These various components of the wireless network 200 may communicate with one another via various wireless interfaces as indicated by 140. Some of these devices may alternatively communicate with one another via wired communication interfaces. For example, the positioning server 101 may communicate with the base stations 102-104 via wired communication interfaces. Likewise, the positioning anchors 130-134 may also communicate with the base stations and/or the positioning server 101 via wired communication interface in addition to or alternative to the wireless communication interfaces.

In the context of 4G (including LTE) or 5G cellular network, the base stations 102, 104, and 106 may include any types of wireless access points within a radio access network (RAN), such as a 4G base station, a 5G NR base station, a 5G central-unit base station, or a 5G distributed-unit base station (the various 5G base stations may be alternatively referred to as next generation nodeB, or gNB). The positioning anchors 130-134 may be distributed in the wireless network 200 to assist positioning of mobile terminals. The positioning anchors 130-134 may be fixed with known geographic locations. Alternatively, the positioning anchors 130-134 may be periodically relocated with their positions optimized for assisting positioning of mobile terminals. The UE or mobile terminal 102 may include but is not limited to a mobile phone, a smartphone, a tablet, a laptop computer, a vehicle on-board communication equipment, a roadside communication equipment, a sensor device, a smart appliance (such as a television, a refrigerator, and an oven), or other devices that are capable of communicating wirelessly over a network.

Each of the mobile terminal 102, base stations 104-108, and positioning anchors 130-134, as shown in FIG. 2, may include a transceiver circuitry 114 coupled to one or more antennas 116 to effectuate wireless communications with other components of the network 200. The transceiver circuitry 114 may be coupled to one or more processors 120, which may further be coupled to a memory 122 or other storage devices. The memory 122 may store therein instructions or code that, when read and executed by the processor 120, cause the processor 120 to implement various network functions. These network functions, for example, may include those related to NLOS time delay estimation and positioning of mobile terminals.

Further in the context of 4G or 5G cellular network, the positioning server 101 (alternatively referred to as positioning service node) may be implemented as a standalone server, or a module, a logical entity, or a function unit in any other network node. For example, the positioning server 101 may be implemented as part of or a unit of a location management function (LMF), a Serving Mobile Location Center (SMLC), an Evolved enhanced SMLC (E-SMLC), or a Secure User Plane Location (SUPL) Location Platform (SLP) that manages positioning of mobile terminals by collecting measurements and other information from various network nodes to provide assistance in positioning mobile terminals. For another example, the positioning server 101 may be integrated with any other functions of the core network of the underlying wireless communication network. Further, the positioning server 101 may be implemented as part of one or more access network nodes such as one or more base stations. The positioning server 101 may be centralized or distributed. The positioning server 101, as shown in FIG. 2, may include one or more processors 110, which may further be coupled to a memory 112 or other storage devices. The memory 112 may store therein instructions or code that, when read and executed by the processor 110, cause the processor 110 to implement various network functions. These network functions, for example, may include those related to NLOS time delay estimation and positioning of the mobile terminals. The positioning server 101 may further include interfaces for communicating wirelessly with other components of the network 200 in some implementations.

While only three base stations, three positioning anchors, one mobile terminal, and one positioning server are shown in FIG. 2, they are not so limited. Any number of these devices may be deployed and/or supported in the network 200.

Functions of Positioning Anchors

Figure 3:
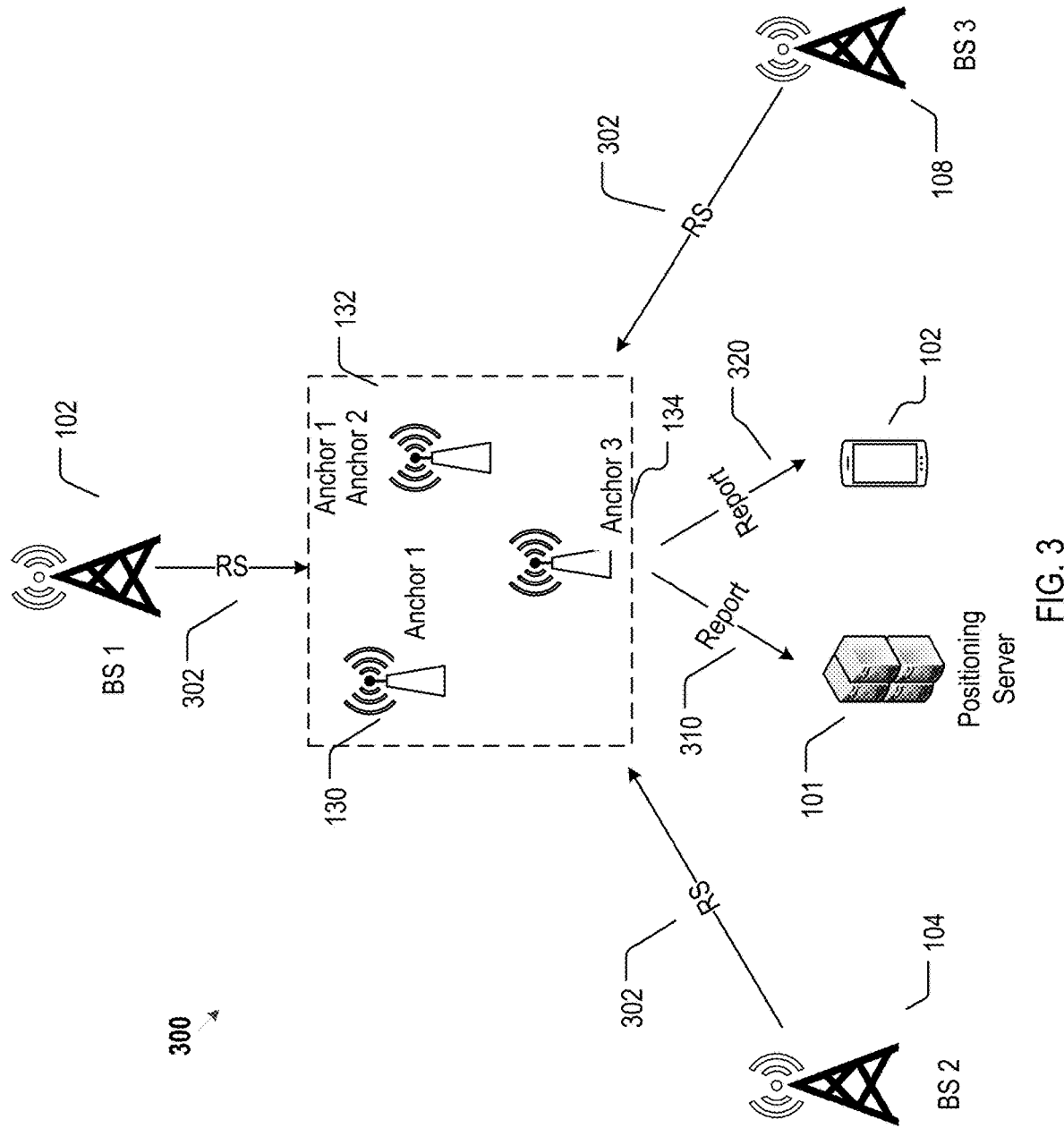
FIG. 3 illustrates an example embodiment for estimating NLOS time delays for wireless positioning anchors.

The positioning anchors 130-134 may be configured to provide reference NLOS time delays for the positioning of mobile terminals adjacent to the positioning anchors, as the NLOS delay times of reference signals from the base stations at adjacent network devices in geographical locations are related. FIG. 3 illustrates example functions of the positioning anchors 130-134. In some example implementations, the positioning anchors 130-134 may measure transmission times of wireless reference signals from the base stations 104-108 to determine lengths of signal transmission paths from the base stations to the positioning anchors and derive NLOS time delays based on the measured signal transmission path lengths and known locations of the base stations and the positioning anchors.

As the underlying principles, because the geographical coordinates of each positioning anchor and each base station are known, the propagation time t1 from a base station to the positioning anchor in the LOS environment can be calculated according to the geographical coordinates of the base station and the positioning anchor. The NLOS time t2 can be estimated or measured according to normal time-of-arrival (TOA) estimation/measurement method. As such, the NLOS excessive time delay (alternatively referred to as NLOS time delay) can be estimated as $\Delta \tau = t2 - t1$.

In reference to FIG. 3, the following example steps may be implemented for obtaining NLOS time delays at each of the positioning anchors:

Step 0: Reference signals are transmitted from each of i'th base station to the j'th positioning anchor, which receives the reference signal, as shown by 302 of FIG. 3.

Step 1: The positioning server 101 transmits the location information $(x_{bi}, y_{bi})$ of the i'th base station to the j'th anchor.

Step 2: The j'th positioning anchor calculates the LOS propagation time between the i'th base station and the j'th anchor according to the location information $(x_{pi}, y_{pi})$ of the positioning anchor and the i'th base station location information $(x_{bi}, y_{bi})$ as $t1 = \text{sqrt}[(x_{pi}-x_{bi})^2 + (y_{pi}-y_{bi})^2]/c$.

Step 3: Using the TOA estimation algorithm to estimate the real transmission time t2 of the reference signal from the i'th base station to the j'th positioning anchor.

Step 4: The j'th positioning anchor may optionally feed back the NLOS time delay (t2-t1) and the location information of the anchor $(x_{pi}, y_{pi})$ to the positioning server 101 or a mobile terminal, as shown by 310 and 320 of FIG. 3.

Following the process above, the NLOS time delay between each of the base stations and each of the positioning anchors may be obtained. The process above may be performed in real-time as needed for positioning of a mobile terminal (example mobile terminal positioning processes are described below). Real-time measurements of NLOS may be beneficial in that they track dynamic environmental changes and variations that can alter the reference signal transmission paths. Alternatively these anchor NLOS time delays may be pre-measured or they may be updated periodically.

Mobile Terminal Positioning Using Positioning Anchor(s)

Once the NLOS time delays between the base stations and the positioning anchors are determined as described above, they may be used as reference NLOS time delays for mobile terminal positioning.

Figure 4:
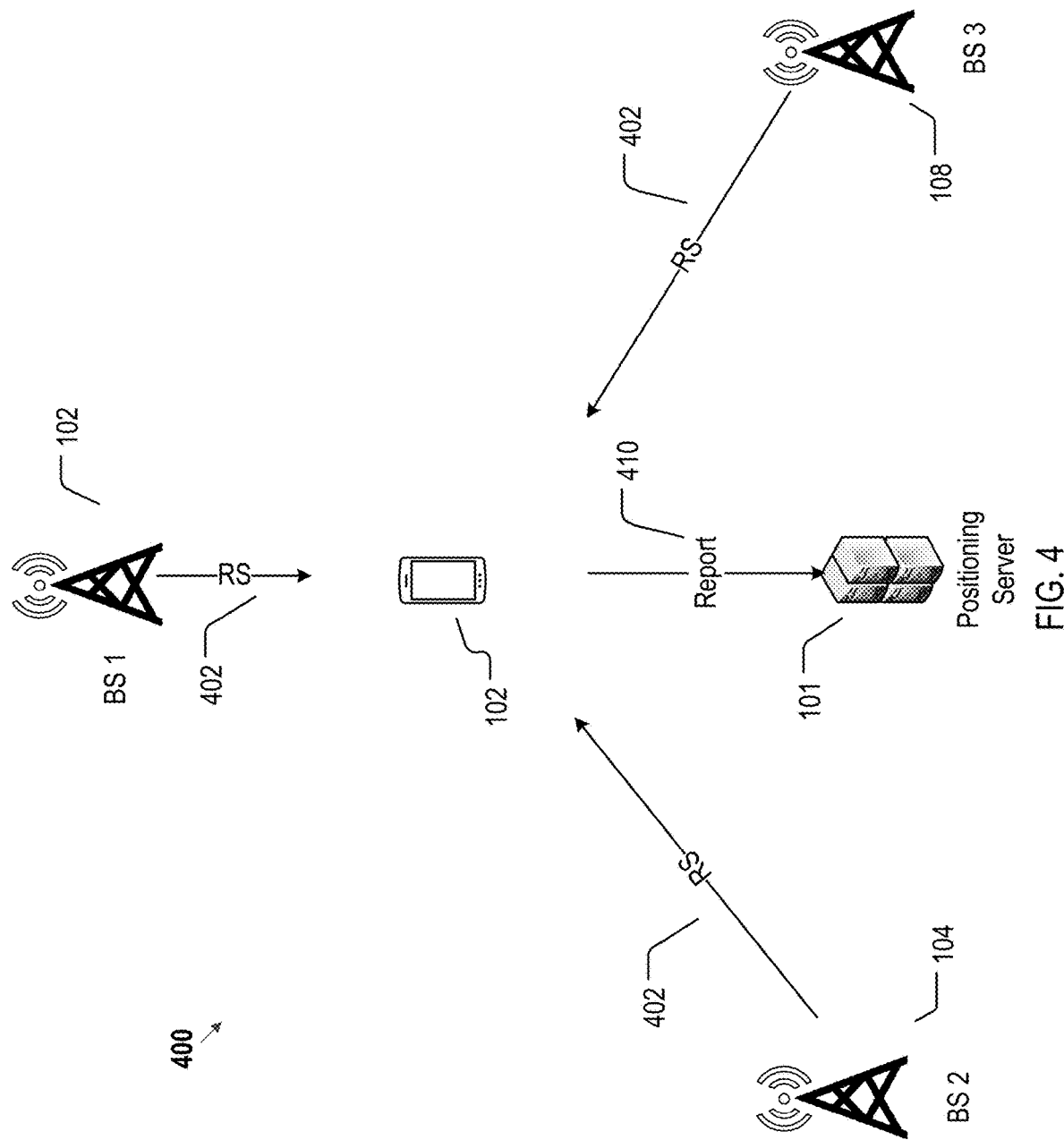
FIG. 4 illustrates an example embodiment for estimating NLOS time delays for improving geographic positioning of a wireless device using wireless positioning anchors.

Referring to FIG. 4, in some example implementations, the following steps may be taken to estimate the position of a mobile terminal:

Step 1: Reference signals are transmitted from each of the base stations to the mobile terminal 102 which receives the reference signals, as shown by 402 of FIG. 4.

Step 2: The mobile terminal 102 measures the Reference Signal Time Differences (RSTDs) base on TOAs of the reference signals from the base stations. Such measured information may be referred to as a set of timing measurement information. Such timing measurement information may include any type of timing measurement of the reference signals, including but not limited to TOAs, RSTDs, reception-transmission time differences, or transmission-reception time differences of the reference signals.

Step 3: The mobile terminal feeds back the RSTDs to the positioning server.

Step 4: The positioning server estimates the position of the mobile terminal based on the measure RSTD (or the measured reference signal transmission path lengths, or the general timing measurement information describe above) and the known positions of the base stations.

Step 5: The positioning server selects one or more positioning anchors as reference anchors according to the locations of the one or more positioning anchors and the estimated position of the mobile terminal. For example, one or more positioning anchors having closest distances to the estimated position of the mobile terminal may be selected as reference anchors. Specifically, a single closest anchor may be selected as a reference anchor. The underlying principle is that the closest anchor to the mobile terminal may have similar environmental conditions to the mobile terminal in terms of multiple reflections and/or refractions of reference signals from the base stations, and thus may be used as a reference anchor for estimating the NLOS time delays in the reference signals for the mobile terminal.

Step 6: The positioning server obtains a reference NLOS time delay from the reference NLOS time delays of the one or more selected reference positioning anchors (by average when more than one reference positioning anchors are selected, or directly use the reference NLOS delay time when a single reference positioning anchor is selected, for example).

Step 7: The positioning server may compensate the measured RSTDs and/or TOAs above for the mobile terminal using the reference NLOS time delay to obtain compensated RSTDs and/or compensated TOAs.

Step 8: The positioning server may then obtain a final position of the mobile terminal using the compensated RSTDs and/or TOAs and the known positions of the base stations.

In some other example implementations to estimate the position of the mobile terminal, some of the steps above may be performed by the mobile terminal rather than the positioning server, as shown by the following steps:

Step 1: Reference signals are transmitted from each of the base stations to the mobile terminal 102 which receives the reference signals, as shown by 402 of FIG. 4.

Step 2: The mobile terminal 102 measures the RSTDs base on TOAs of the reference signals from the base stations.

Step 3: The mobile terminal estimates the position of the mobile terminal based on the measure RSTD (or the measured reference signal transmission path lengths) and the known positions of the base stations.

Step 4: The mobile terminal selects one or more positioning anchors as reference anchors according to the locations of the one or more positioning anchors and the estimated position of the mobile terminal. For example, one or more positioning anchors having closest distances to the estimated position of the mobile terminal may be selected as reference anchors. Specifically, a single closest anchor may be selected as a reference anchor. The underlying principle is that the closest anchor to the mobile terminal may have similar environmental conditions to the mobile terminal in terms of multiple reflections and/or refractions of reference signals from the base stations, and thus may be used as a reference anchor for estimating the NLOS time delays in the reference signals for the mobile terminal.

Step 5: The mobile terminal obtains a reference NLOS time delay from the reference NLOS time delays of the one or more selected reference positioning anchors (by average when more than one reference positioning anchors are selected, or directly use the reference NLOS delay time when a single reference positioning anchor is selected, for example).

Step 6: The mobile terminal may optionally compensate the measured RSTDs and/or TOAs with the reference NLOS time delay to obtain compensated RSTDs and/or compensated TOAs.

Step 7: The mobile terminal feeds back the measured or compensated RSTDs/TOAs and the reference NLOS time delays and the position(s) of the reference positioning anchors to the positioning server.

Step 8: The positioning server may compensate the measured RSTDs and/or TOAs above for the mobile terminal using the reference NLOS time delay to obtain compensated RSTDs and/or compensated TOAs, if that has not been done at the mobile terminal.

Step 9: The positioning server may then obtain a final position of the mobile terminal using the compensated RSTDs and/or TOAs and the known positions of the base stations.

The implementations above are merely examples. Those having ordinary skill in the art appreciate that any other manners in which the various steps are distributed among the various network elements above can be derived based on the principles described above and are within the scope of this disclosure.

NLOS Delay Times and Position Estimate Using Multiple Antennas

In some other implementations, multiple spatially separate antennas in the mobile terminal may be utilized to estimate the position of the mobile terminal when, for example, distances, relative positions, or relative position offset between the multiple antennas are known, assuming that the multiple antennas experience similar NLOS delay times with respect to reference signals transmitted from the various base stations due to the spatial proximity of the antennas. In particularly, the NLOS delay times may be estimated using the multiple antennas. The estimated NLOS delay times may then be used to compensate the measured RSTDs and/or TOAs for position estimation of the mobile terminal.

For example, the mobile terminal may include N spatially separate antennas at different positions. The relative positions of different antennas are known. For example, the relative distance between two antennas may be known and denoted as d, the NLOS delay times may be estimated according to the N antennas. For example, assuming two antenna are available and according to the RSTD algorithm, the position (x, y) of the first antenna can be estimated based on Equation (1) as:

$$[x_{i,1} \quad y_{i,1}]\begin{bmatrix} x \\ y \end{bmatrix} = -((r_{i,1} + \Delta r)r_1 + 0.5((r_{i,1} + \Delta r)^2 - K_i + K_1)),$$

whereas the position (x', y') of the second antenna can be estimated based on Equation (2) as:

$$[x'_{i,1} \quad y'_{i,1}]\begin{bmatrix} x' \\ y' \end{bmatrix} = -((r'_{i,1} + \Delta r)r'_1 + 0.5((r'_{i,1} + \Delta r)^2 - K_i + K_1)),$$

where, $x_{i,1}=x_i-x_1$, $y_{i,1}=y_i-y_1$ representing the coordinate difference between the i'th base station of n base stations and a reference base station (the first BTS); $K_i=x_i^2+y_i^2$, i=1,2,3; $r_{i,1}+\Delta \tau=r_i-r_1$ representing distance difference between the i'th base station and the reference base station; and $\Delta \tau = \Delta \tau \times c$ representing the distance difference corresponding to $\Delta \tau$. Assuming that the antenna positions (x, y) and (x', y') are close to each other, their NLOS delay times may be considered equal. In addition, the distance d between the first and second antennas is known:

$$(x-x')+(y-y')^2=d^2.$$

As such, $\Delta \tau$ or the NLOS delay times with respect to each base station can be obtained by using the combined equations above.

Figure 5:
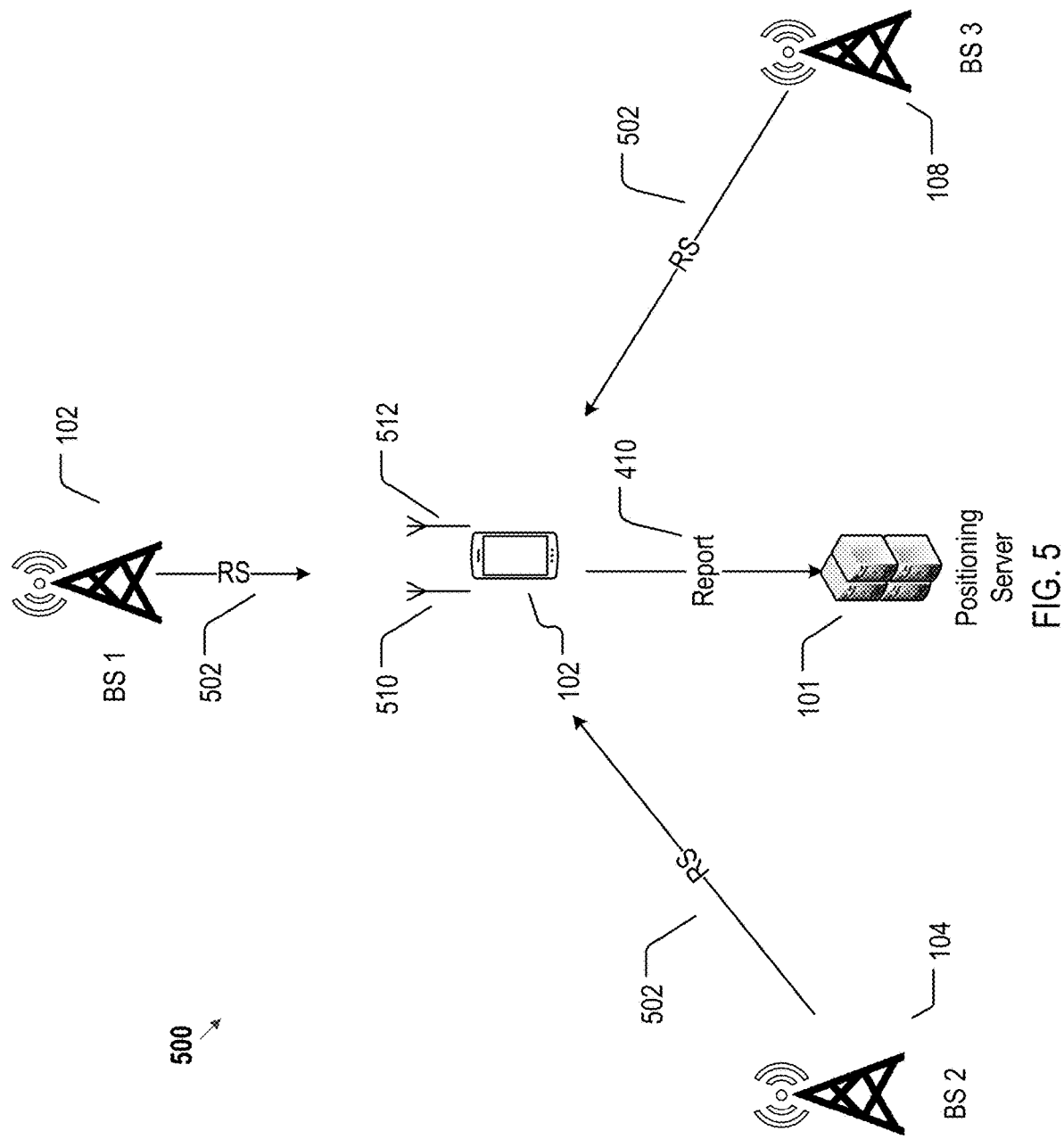
FIG. 5 illustrates another example embodiment for estimating NLOS time delays for improving geographic positioning of a wireless device using multiple antennas of the wireless device.

In reference to FIG. 5, in some example implementations, the following steps may be used to estimate the NLOS delay times:

Step 1: As shown by 502 of FIG. 5, the mobile stations transmits reference signals to the mobile terminal and the mobile terminal receives the reference signals via multiple antennas 510 and 512.

Step 2: The mobile terminal estimates the $TOA_{ij}$ between the j'th base station and the i'th antenna.

Step 3: The mobile terminal feeds back the $TOA_{ij}$ and the relative distances between the antennas to the positioning server 101.

Step 4: The positioning server estimates the NLOS delay times $\Delta \tau$ according to the $TOA_{ij}$ and the relative distances between the antennas based on the equations above.

In some other implementations, some of the steps above may be performed by the mobile terminal rather than the positioning server. For example, the mobile terminal rather than the positioning server may perform the estimation of the NLOS delay times. As such, the mobile terminal may not need to perform Step 3 above, and Step 4 may be performed by the mobile terminal rather than the positioning server.

Once the NLOS delay times are obtained either by the positioning server or by the mobile terminal followed by the mobile terminal feeding back the NLOS delay times to the positioning server, the position of the mobile terminal may then be estimated in manners similar to those described previously. For example, in some implementations, the positioning server may obtain compensated $TOA_{ij}$ based on measured $TOA_{ij}$ and the NLOS delay times $\Delta\tau$. For example, the compensated $TOA_{ij}$ may be estimated as $TOA_{ij}-\Delta\tau$. The positioning server may then use the compensated $TOA_{ij}$ to calculate the location of the mobile terminal.

Figure 6:
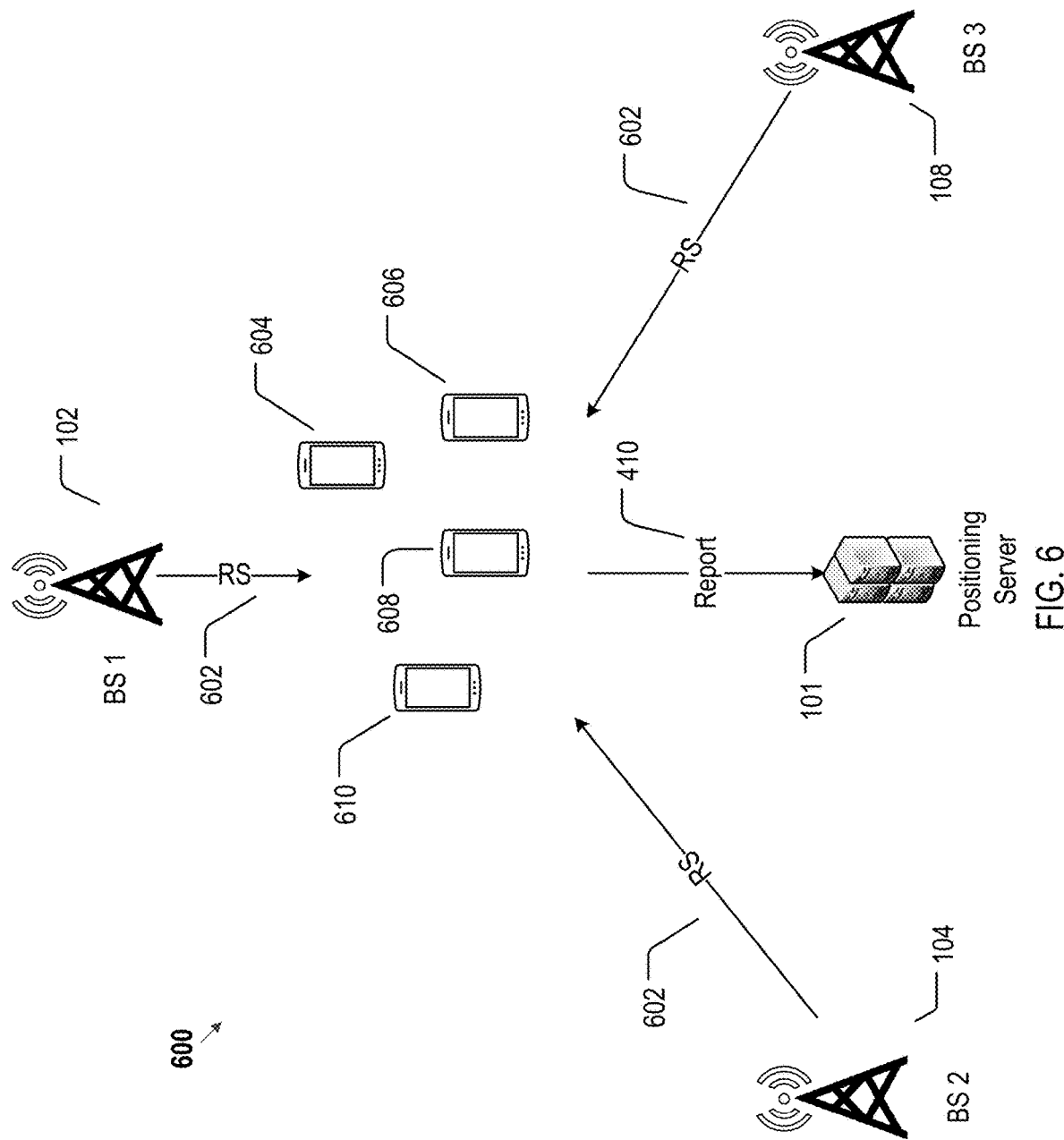
FIG. 6 illustrates yet another example embodiment for estimating NLOS time delays for improving geographic positioning of a wireless device using multiple neighboring wireless devices.

The implementations above are merely examples. Those having ordinary skill in the art appreciate that any other manners in which the various steps are distributed among the various network elements above can be derived based on the principles described above and are within the scope of this disclosure Joint Positioning of Multiple Mobile Terminals at Different Positions In some implementations, multiple mobile terminals may be used to jointly estimate their positions. Referring to FIG. 6, these mobile terminals, shown as 604-610 may be located at different positions. They may be located in close proximity. As such, their NLOS time delays of reference signals from the various base stations may be assumed to be identical. Further assuming that one antenna from each of the mobile terminals is used for receiving the reference signals (shown as 602) from the base stations, the multi-antenna method above may be used for estimate the NLOS time delay for the mobile terminals. Then the position of each of the mobile terminals 604-610 may be estimated in a similar manner as discussed above for position estimate of the multi-antenna mobile terminal, and as shown below:

Step 0: The positioning server determines a set of N mobile terminals for joint positioning. The selection of the mobile terminal set may be based on spatial proximity, and/or environmental similarity, for example.

Step 1: The i'th mobile terminal estimates the $TOA_{ij}$ between the j'th base station and the i'th mobile terminal.

Step 2: The i'th mobile terminal estimates the distances $d_{ik}$ between the i'th mobile terminal and the k'th mobile terminal (this is equivalent to the distance d between separate antennas described above, except here the distances $d_{ik}$ are estimated rather than known).

Step 3: the mobile terminals may feed back the $TOA_{ij}$ and $d_{ik}$ to the positioning server.

Step 4: The positioning server then calculates the NLOS delay time $\Delta\tau$ according to the received $TOA_{ij}$, $d_{ik}$, and the known positions of the base stations using similar equations described above for the multi-antenna implementations.

Step 5: The positioning server then obtains the compensated $TOA_{ij}$ according to the NLOS delay time $\Delta\tau$ and $TOA_{ij}$, as, for example $TOA_{ij}-\Delta\tau$, Step 6: The positioning server may then uses the compensated $TOA_{ij}$ and the known positions of the base stations to calculate the position of the mobile terminals.

Multiple antennas for some of the mobile terminals above may be used. As such, the implementations above and the multi-antenna implementations may be combined.

The implementations above are merely examples. Those having ordinary skill in the art appreciate that any other manners in which the various steps are distributed among the various network elements above can be derived based on the principles described above and are within the scope of this disclosure.

Directly Solving NLOS Delay Time

In some other implementations, the NLOS delay times may be directly and approximately solved from the reference signal timing measurements. For example, assuming that the estimated distance from the mobile terminal (x, y) to the i'th base station (xi, yi) is $r_i$, then the actual LOS distance is $r_i-\Delta r_i$, where $\Delta r_i=\Delta\tau_i \times c$ is the distance difference corresponding to $\Delta\tau_i$, the NLOS delay time with respect to the i'th base station. Therefore:

$$\begin{cases} (x-x_1)^2 + (y-y_1)^2 = (r_1 - \Delta r_1)^2 & (1) \\ (x-x_2)^2 + (y-y_2)^2 = (r_i - \Delta r_2)^2 & (2) \\ \ldots \\ (x-x_n)^2 + (y-y_n)^2 = (r_n - \Delta r_n)^2 & (n) \end{cases}$$

By subtracting formula (1) above from formulae (i), (i=2, . . . , n), the following are obtained.

$$\begin{cases} 2x(x_2-x_1) + 2y(y_2-y_1) = f(\Delta r_1, \Delta r_2) & (1) \\ 2x(x_3-x_1) + 2y(y_3-y_1) = f(\Delta r_1, \Delta r_3) & (2) \\ \ldots \\ 2x(x_n-x_1) + 2y(y_n-y_1) = f(\Delta r_1, \Delta r_n) & (n-1) \end{cases}$$

where, $f(\Delta r_1, \Delta r_i) = r_i^2 - r_1^2 + \Delta r_i^2 - \Delta r_1^2 + 2(\Delta r_i - \Delta r_1) + K_i - K_1$,
$K_i = x_i^2 + y_i^2, i=1, \ldots, n$, Assuming $\Delta r_i$ is much smaller than $r_i$, then $\Delta r_i - \Delta r_i^2 \approx 0$, Thus:

$f(\Delta r_1, \Delta r_i) \approx r_i^2 - r_1^2 + K_i - K_1 + 2(\Delta r_i - \Delta r_i)$ The equations above may be simplified to:

$$\begin{cases} x(x_2-x_1) + y(y_2-y_1) = \Delta r_{2,1} + a_{21} & (1) \\ x(x_3-x_1) + y(y_3-y_1) = \Delta r_{3,1} + a_{3,1} & (2) \\ \ldots \\ x(x_n-x_1) + y(y_n-y_1) = \Delta r_{n,1} + a_{n,1} & (n-1) \end{cases}$$

where, $a_{i,1} \approx 0.5*(r_i^2 - r_1^2 + K_i - K_1)$, $\Delta\tau_{i,1} = \Delta r_i - \Delta r_1$.

The set of equations above contains n−1 equations and n+1 variables (x, y, and $\Delta r_{i,1}$, where i=2, . . . , n). In order to obtain the solution to $\Delta r_{i,1}$, two smallest $\Delta r_{i,1}$ values $\Delta r^{i,1}$ may be approximated and brought into the equations, reducing the number of variables to n−1, matching the number equations. As such, $\Delta r_{i,1}$ need to be sorted in order to determine the smallest two $\Delta r_{i,1}$. In some implementations, two randomly selected $\Delta r_{i,1}$ may be set to zero in the equations above. For each random selection, other $\Delta r_{i,1}$ may be solved. Among all the solutions, statistically two smallest two $\Delta r_{i,1}$ may be determined as solutions to these two $\Delta r_{i,1}$. These smallest $\Delta r_{i,1}$ may then be input into the equations above and the other $\Delta r_{i,1}$ and the (x, y) can then be obtained by solving these equations. In some other implementations, the mobile terminal may determine its probabilities of having LOS communication to each of the base stations, and order the base stations according to these probabilities. The $\Delta r_{i,1}$ corresponding to the two base stations with the highest LOS probabilities may be set as zero or some other small values in the equations above for solving the rest of the $\Delta r_{i,1}$. For example, LOS probability of reference signal propagation between a base station and the terminal may be measured, for example, based on signal strength or power ratio of detected reference signal along various LOS and/or NLOS signal paths from the base station to the mobile terminal (the signal strength due to different signal paths can be obtained from time domain analysis of the detected referenced signal). Alternatively, measured TOAs may be used as indication of the LOS probabilities for the base stations. For example, smaller TOAs may correspond to higher LOS probability as base stations closer to the mobile terminal may be subject to less NLOS delays. Once the LOS probabilities are ordered, $\Delta r_{i,1}$, corresponding to the highest two or more LOS probabilities (or highest priority) may be set to zero or some other small values, and thus $\Delta r_{i,1}$ associated with other reference signal transmission may be solved based on the equations above. Once all the $\Delta r_{i,1}$ are determined, the NLOS delay times may be obtained through this example process. Once the NLOS delay times are obtained, the position of the mobile terminal may be estimated following the various implementations above.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method, performed by a positioning service node in a wireless communication network, comprising:
   obtaining a set of timing measurement information associated with reference signals transmitted by a plurality of wireless network nodes and received by a mobile terminal;
   obtaining geographic locations of the plurality of wireless network nodes;
   obtaining estimated time delays in signal propagation times of the reference signals beyond corresponding line-of-sight (LOS) transmission times by: selecting at least one anchor device from a plurality of anchor devices of the wireless communication network and obtaining the time delays from anchor time delays associated with the plurality of wireless network nodes and the at least one selected anchor device;
   compensating the set of timing measurement information with the estimated time delays to obtain a compensated timing measurement information; and
   determining a geographic position of the mobile terminal based on the compensated timing measurement information and the geographic locations of the plurality of wireless network nodes.

2. The method of claim 1, wherein the anchor time delays associated with the at least one selected anchor device are:
   predetermined and reported to the positioning service node by the at least one selected anchor device or estimated in real-time; or
   predetermined by the positioning service node based on anchor reference signal timing measurements reported by the at least one selected anchor device.

3. The method of claim 1, wherein obtaining the anchor time delays comprises:
   determining the anchor time delays in anchor signal propagation times of anchor reference signals transmitted from the plurality of wireless network nodes to the at least one selected anchor device beyond corresponding anchor reference signal LOS transmission times; or
   obtaining the anchor time delays by averaging separate anchor time delays associated with the plurality of wireless network nodes and separate anchor devices of the at least one selected anchor device.

4. The method of claim 3, wherein the corresponding anchor reference signal LOS transmission times are determined based on the geographic locations of the plurality of wireless network nodes and geographical locations of the at least one selected anchor device.

5. The method of claim 1, wherein selecting the at least one anchor device comprises selecting the at least one anchor device geographically closest to an estimated geographic position of the mobile terminal derived based on the set of timing measurement information and the geographic locations of the plurality of wireless network nodes.

6. The method of claim 1, wherein the set of timing measurement information are further associated with two or more separate antennas of the mobile terminal.

7. The method of claim 6, wherein the set of timing measurement information comprises signal transmission times of the reference signals from the plurality of wireless network nodes to each of the two or more separate antennas of the mobile terminal.

8. The method of claim 7, further comprising obtaining inter-antenna distances between the two or more separate antennas.

9. The method of claim 8, wherein obtaining the time delays comprises:
estimating the time delays in the signal propagation times of the reference signals beyond the corresponding LOS transmission times based on the set of timing measurement information, the inter-antenna distances, and the geographic locations of the plurality of wireless network nodes; or
estimating the time delays based on the set of timing measurement information and the geographic locations of the plurality of wireless network nodes by ordering LOS probabilities of reference signal propagation between the wireless network nodes and the mobile terminal and solving non-line-of-sight (NLOS) delay times by prioritizing the NLOS delay times according to the LOS probability ordering.

10. The method of claim 1, further comprising receiving a second set of timing measurement information associated with reference signals transmitted by the plurality of wireless network nodes and received by a second mobile terminal, wherein obtaining the time delays associated with the mobile terminal comprises estimating the time delays based on the set of timing measurement information, the second set of timing measurement information, the geographic locations of the plurality of the wireless network nodes, and an estimated distance between the mobile terminal and the second mobile terminal.

11. The method of claim 10, wherein the estimated distance between the mobile terminal and the second mobile terminal is derived from a first estimated position of the mobile terminal and a second estimated position of the second mobile terminal.

12. The method of claim 11, wherein:
the first estimated position of the mobile terminal is based on the set of timing measurement information and the geographic locations of the plurality of wireless network nodes; and
the second estimate position of the second mobile terminal is based on the second set of timing measurement information and the geographic locations of the plurality of wireless network nodes.

13. A method, performed by a mobile terminal, comprising:
receiving reference signals from a plurality of wireless network nodes;
measuring reference signal propagation times of the received reference signals;
obtaining estimated time delays in the reference signal propagation times beyond corresponding line of sight (LOS) transmission times, wherein the estimated time delays are obtained from an anchor device, and wherein the anchor device is selected from a plurality of candidate anchor devices based on an estimated distance between the anchor device and the mobile terminal; and
transmitting the estimated time delays and the reference signal propagation times, or transmitting a compensated reference signal propagation times based on the reference signal propagation times compensated by the estimated time delays to a positioning service node to cause the positioning service node to estimate a geographic position of the mobile terminal.

14. The method of claim 13, further comprising compensating the reference signal propagation times with the estimated time delays to obtain the compensated reference signal propagation times.

15. The method of claim 13, wherein measuring the reference signal propagation times of the received reference signals comprises measuring the reference signal propagation times by at least two separate antennas of the mobile terminal.

16. The method of claim 15, wherein obtaining estimated time delays comprises determining the estimated time delays based on the reference signal propagation times associated with the plurality of wireless network nodes and the at least two separate antennas, geographic locations of the plurality of wireless network nodes, and distances between the at least two separate antennas.

17. A method, performed by an anchor device, comprising:
receiving reference signals trans-mitted from a plurality of wireless network nodes;
obtaining geographic locations of the plurality of wireless network nodes;
determining time delays in signal propagation times of the reference signals beyond corresponding line-of-sight (LOS) transmission times; and
transmitting the time delays to a positioning server or a mobile terminal to enable the positioning server or the mobile terminal to perform geographic positioning of the mobile terminal, wherein the anchor device is configured to be selected from a plurality of candidate anchor devices based on an estimated distance between the anchor device and the mobile terminal.

18. The method of claim 17, wherein determining the time delays in the signal propagation times of the reference signals beyond the corresponding LOS transmission times comprises:
determining the signal propagation times of the reference signals based on reception times of the reference signals at the anchor device;
determining LOS distances between the plurality of wireless network nodes and the anchor device; and
determining the time delays based on the signal propagation times and the LOS distances.

* * * * *